Figure 1:
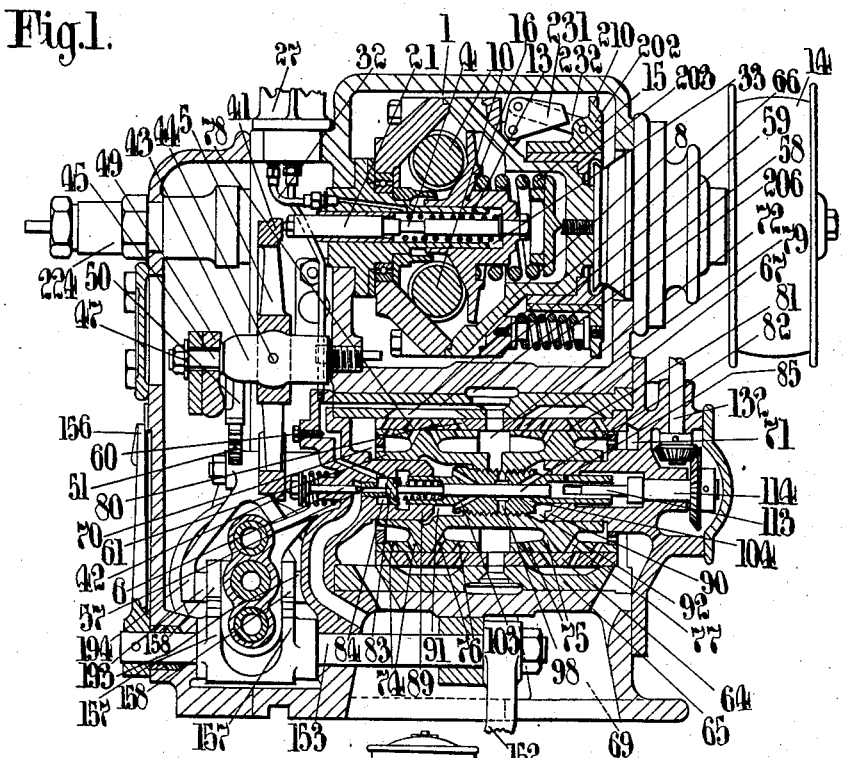

Jan. 14, 1930.　　　P. W. SEEWER　　　1,743,732
MECHANISM OF SPEED GOVERNOR DEVICES
Filed Sept. 12, 1925　　11 Sheets-Sheet 1

P. W. SEEWER
INVENTOR

BY

ATTORNEY

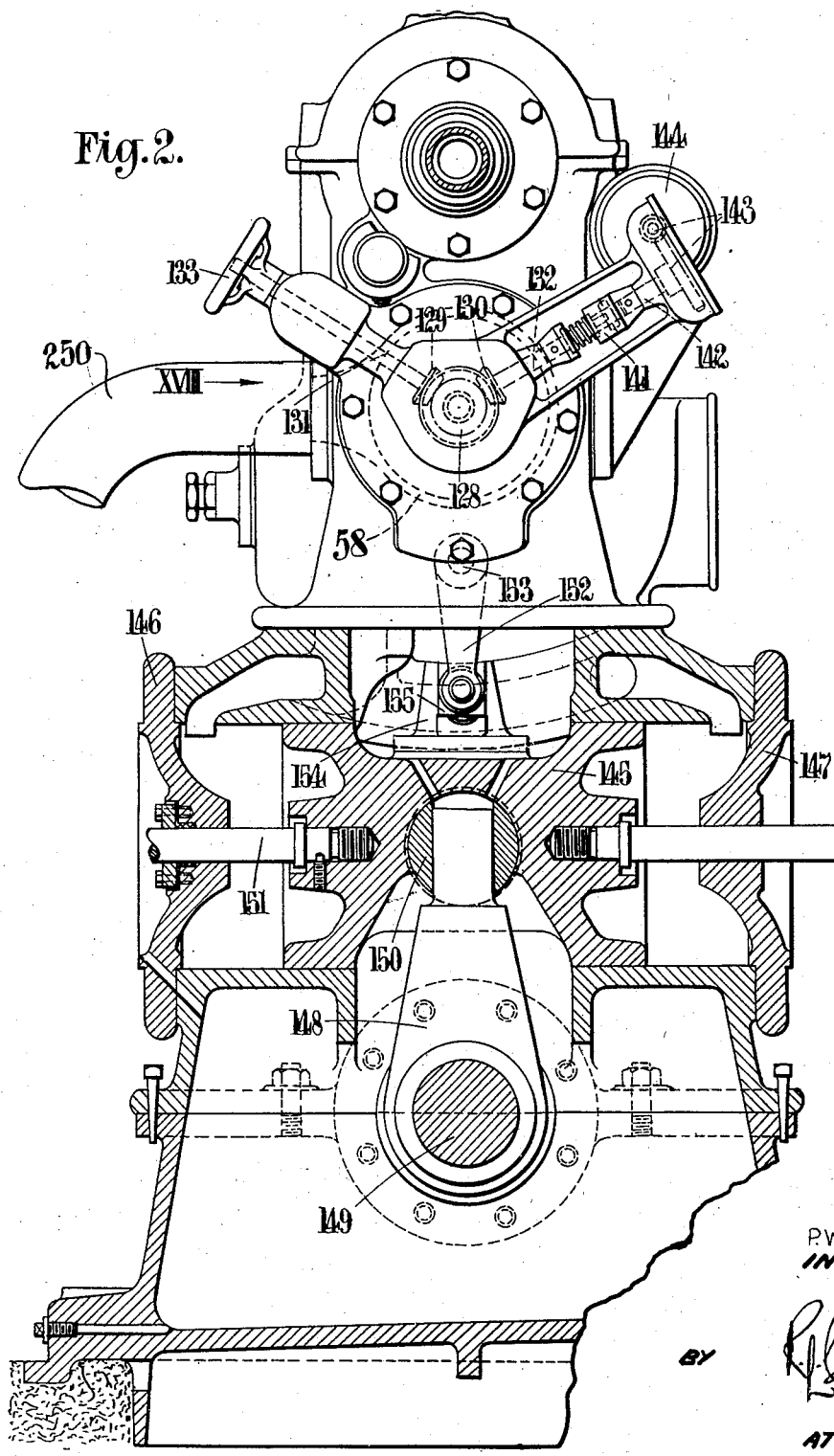

Jan. 14, 1930.  P. W. SEEWER  1,743,732
MECHANISM OF SPEED GOVERNOR DEVICES
Filed Sept. 12, 1925  11 Sheets-Sheet 3
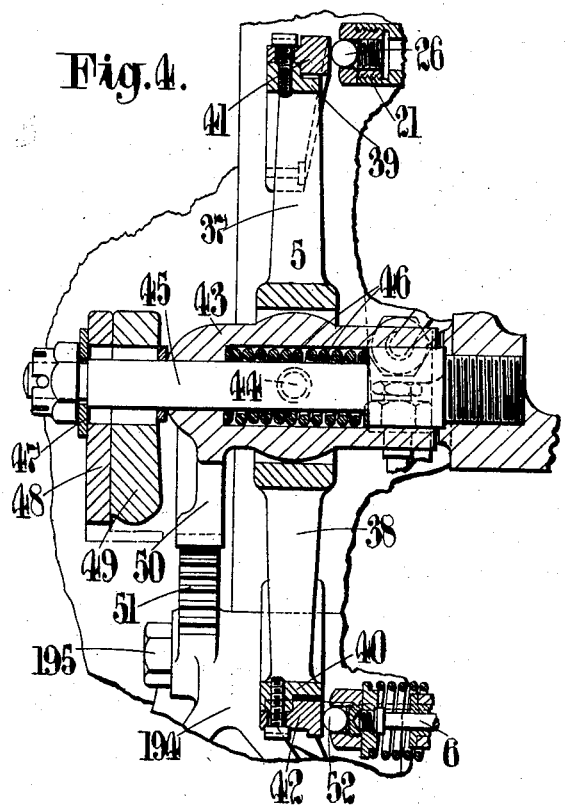
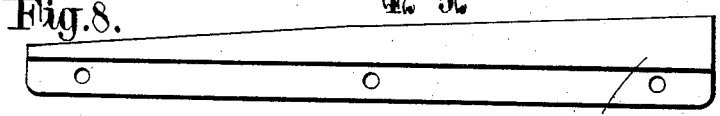
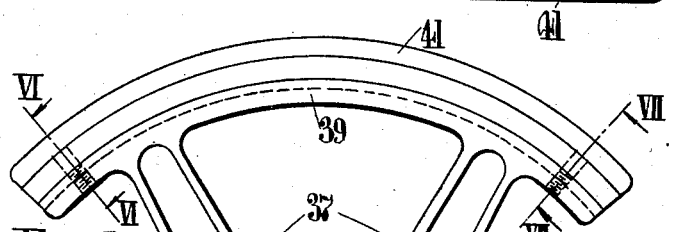
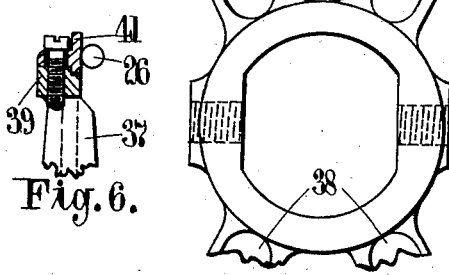
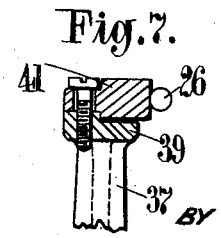
P. W. SEEWER
INVENTOR
BY
ATTORNEY

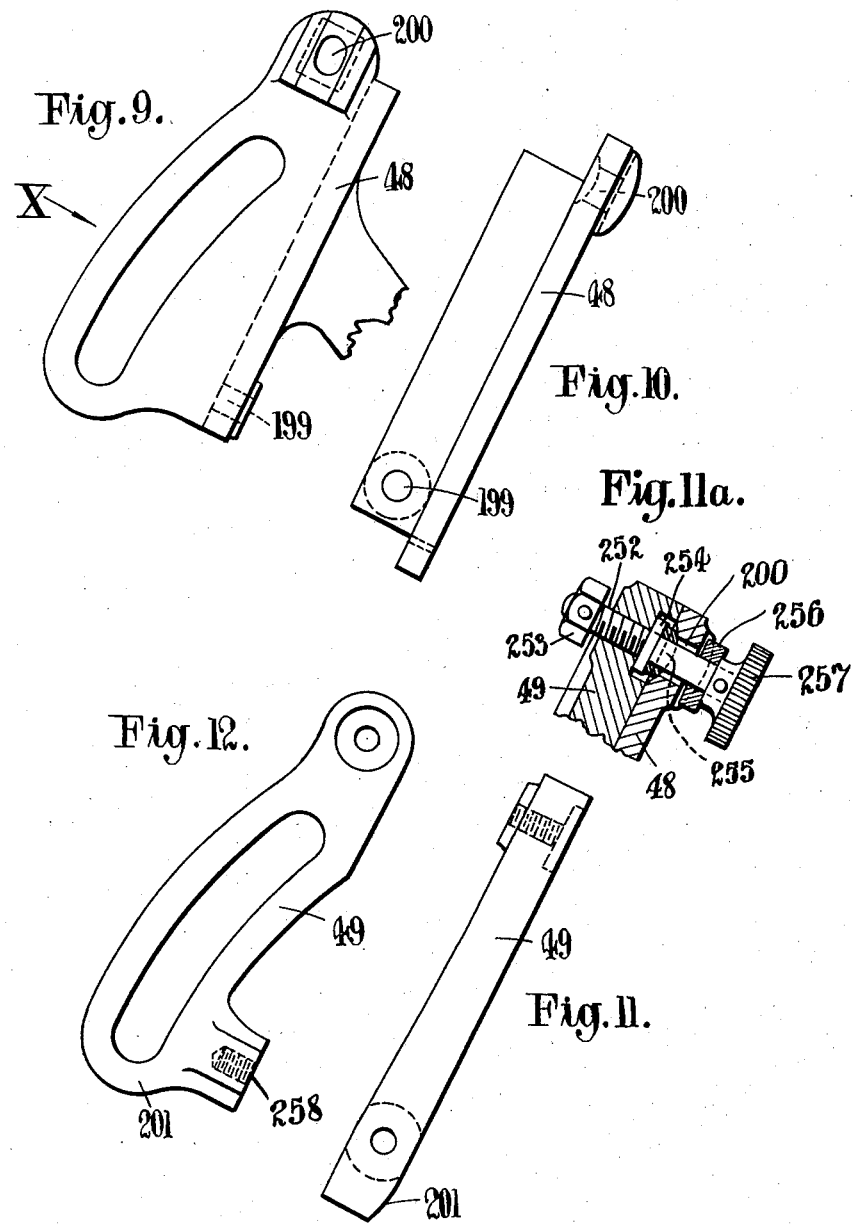

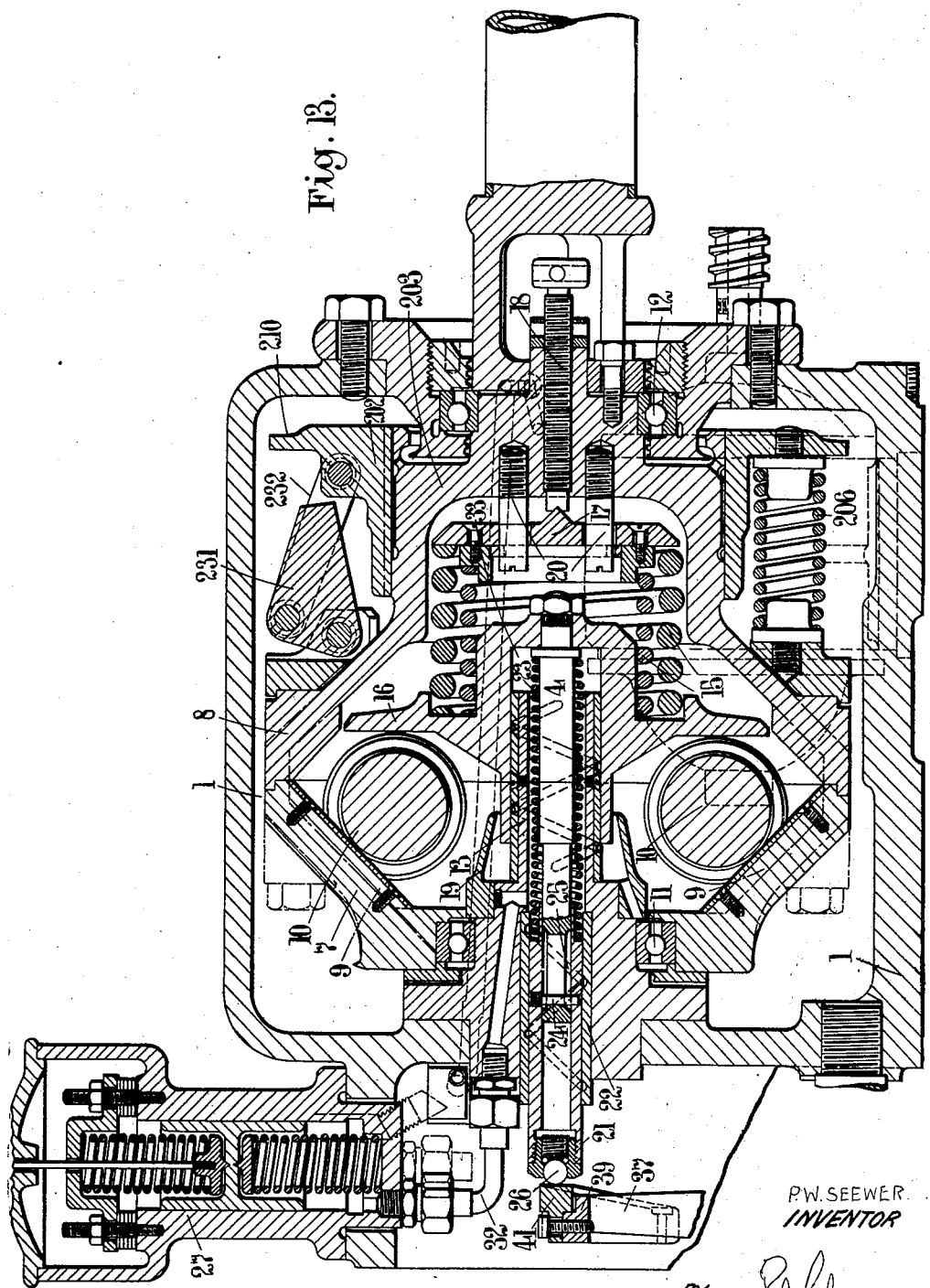

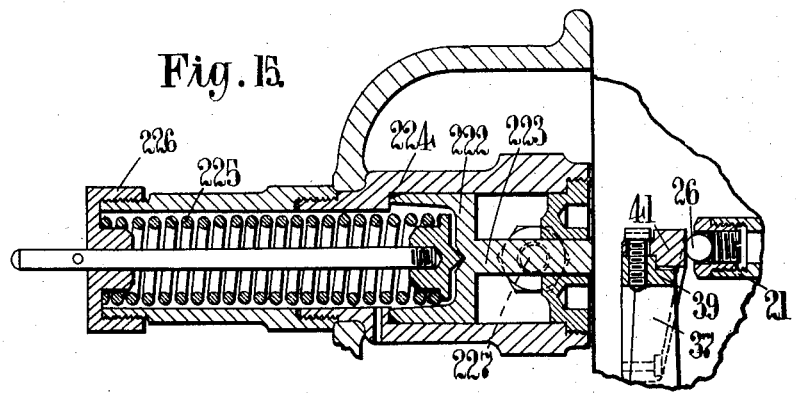
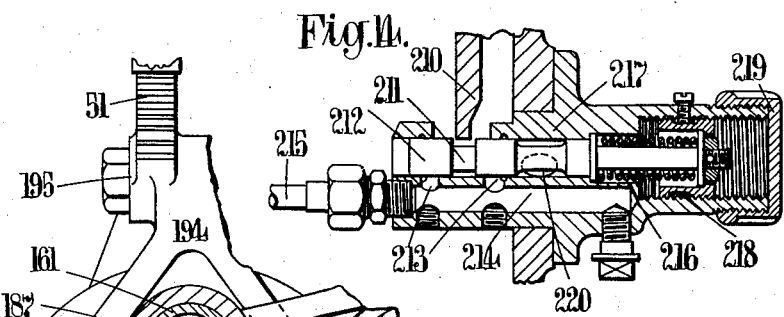
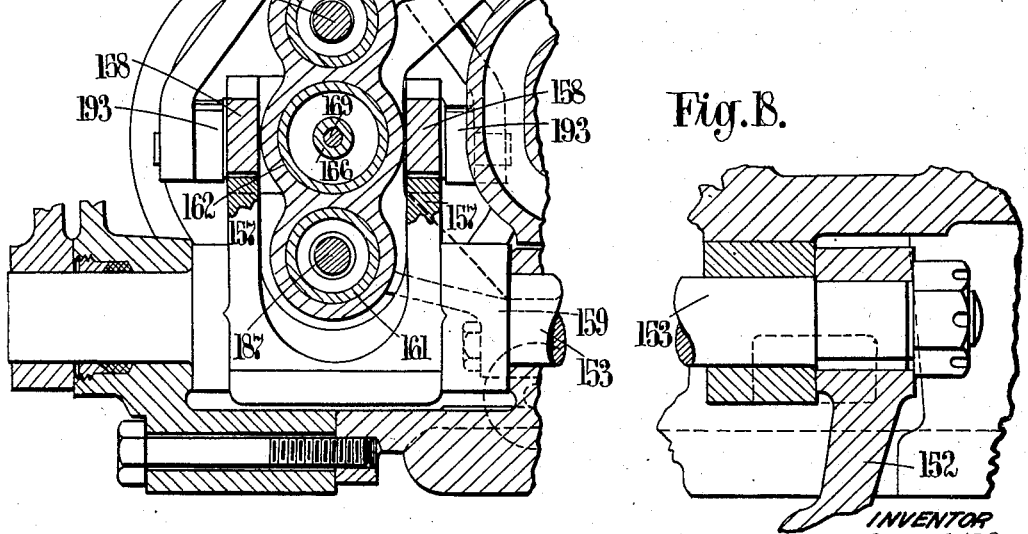

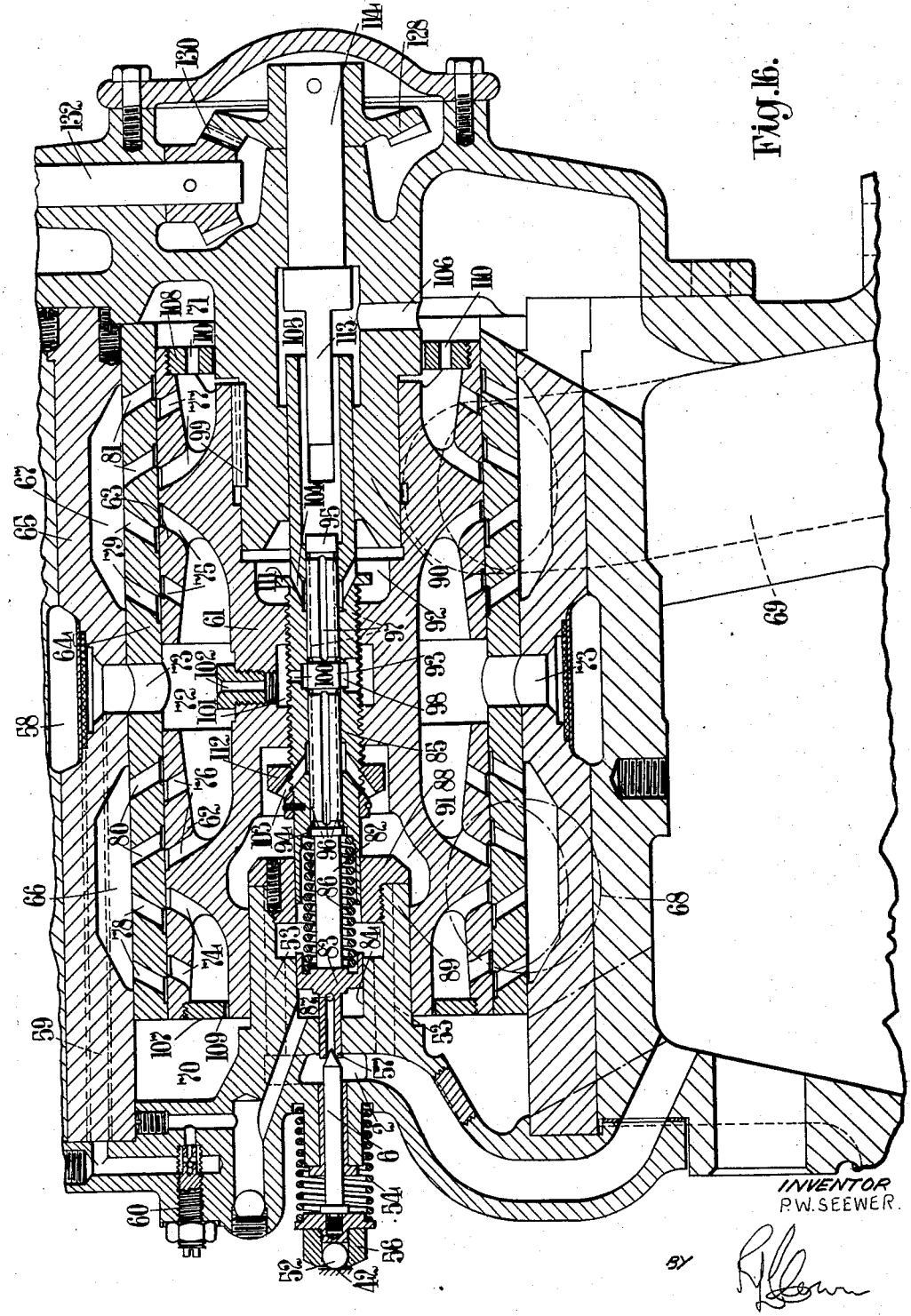

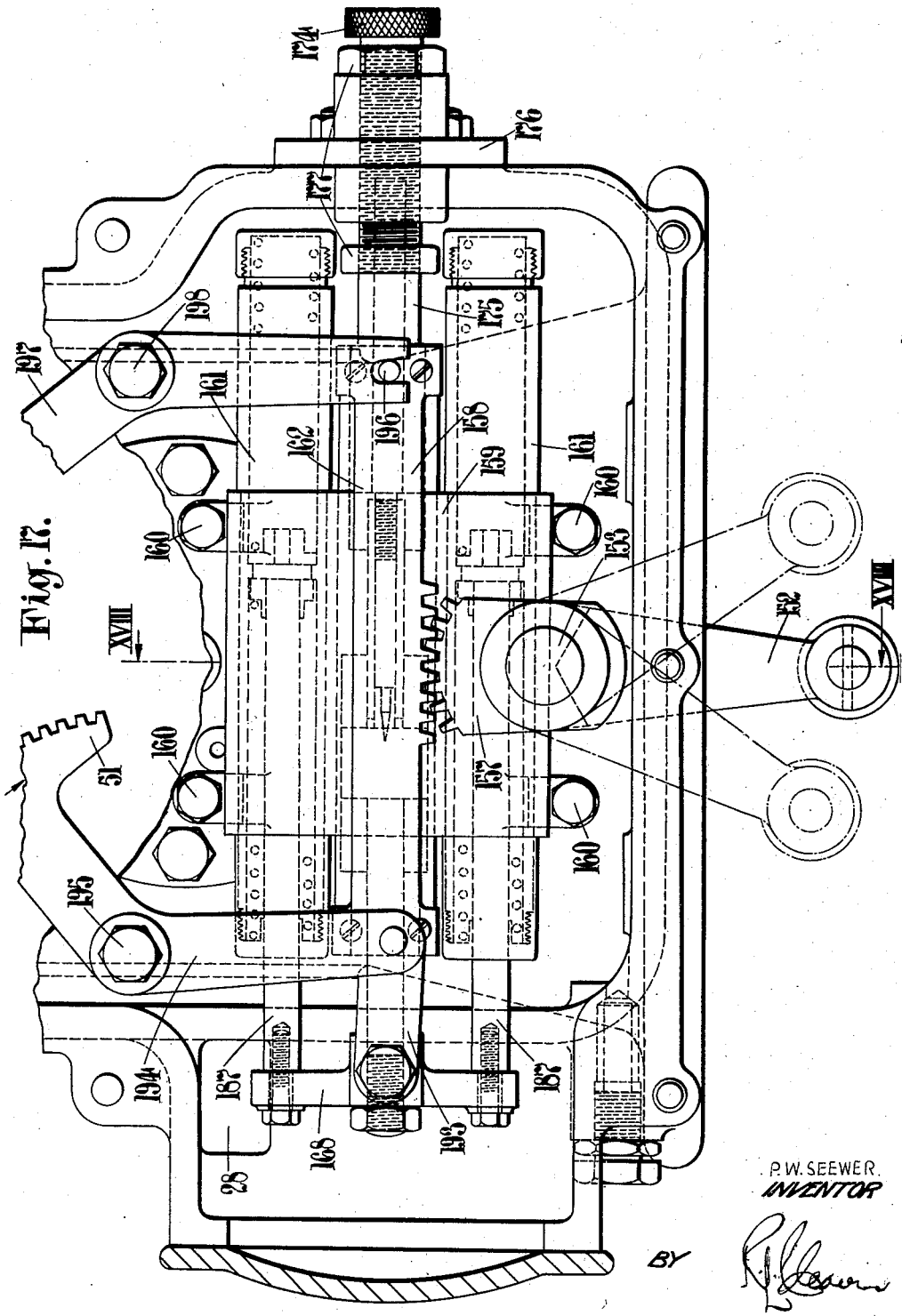

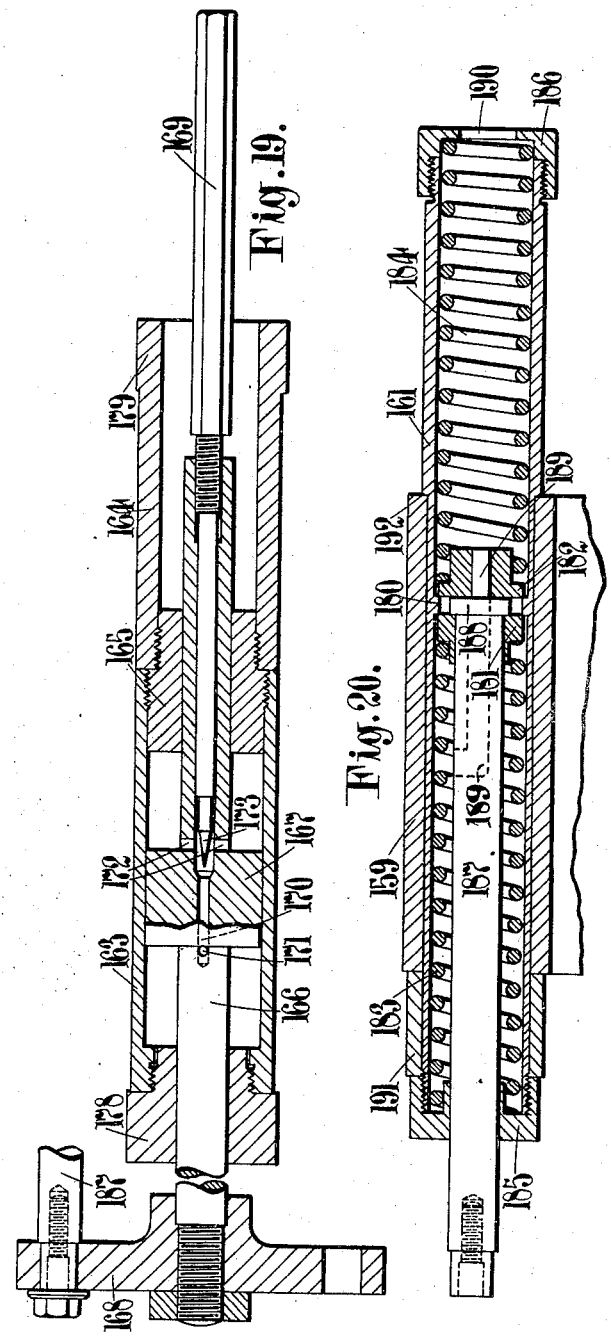

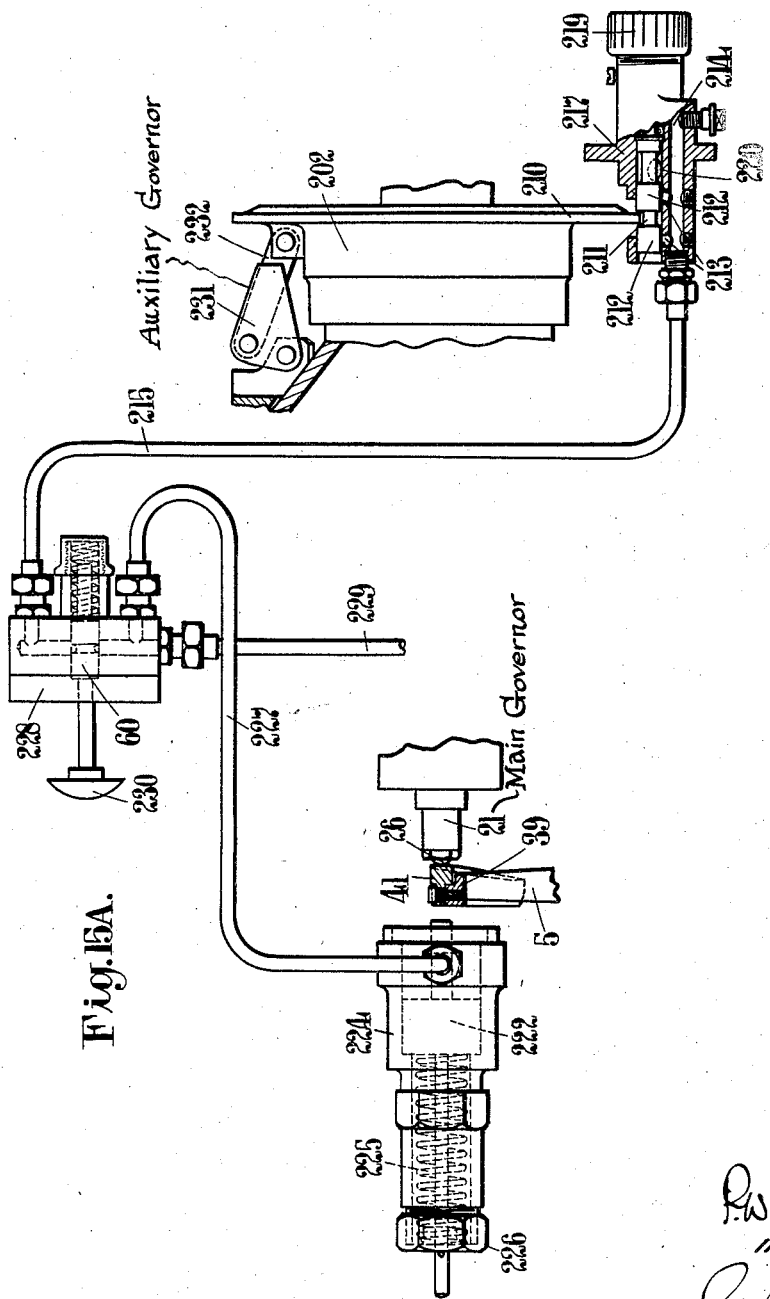

Patented Jan. 14, 1930

1,743,732

UNITED STATES PATENT OFFICE

PAUL WERNER SEEWER, OF LONDON, ENGLAND, ASSIGNOR TO THE ENGLISH ELECTRIC COMPANY LIMITED, OF LONDON, ENGLAND, A BRITISH COMPANY

MECHANISM OF SPEED-GOVERNOR DEVICES

Application filed September 12, 1925, Serial No. 56,036, and in Great Britain September 30, 1924.

This invention relates to governor gear for the speed control of prime movers, being more particularly intended for use with hydraulic turbines. The gear is of the type in which a centrifugal governor actuates a sliding member which, through a rocking lever, transmits movement to a pilot valve which controls the position of a distributing valve which determines the flow of pressure fluid to and from a servo-motor by which the controlling member of the prime mover is actuated. The servo-motor in its movement brings about the re-adjustment of the pilot valve so that the distributing valve is moved so as to bring the servo-motor to rest when a desired control has been carried out.

The centrifugal governor embodied in the present invention is preferably of the known type in which the weights are in the form of rollers which, under the influences of centrifugal force and the balancing spring, can be caused to travel on special projecting courses in a rotary member. By this radial movement they bring about the axial adjustment of the position of a second rotary member in relation to the first member owing to the inclination of the projecting courses. This second rotary member imparts axial movement to a rod which acts upon one end of the rocking lever, by the other end of which the position of the pilot valve is controlled. In accordance with the invention this lever is capable of having a compound motion including (1) rocking in a plane containing the axis of the actuating rod and of the pilot valve (2) turning about an axis in that plane, this axis intersecting the axis about which the first movement takes place, and generally, also (3) a motion of translation.

The first of these movements is used for the purpose of transmitting to the pilot valve the initial displacement which occurs when a change in speed takes place. The second is used in bringing about the return motion of the pilot valve which is due to the movement of the servo-motor, which return motion can be temporary only. The third movement provides for the obtaining of a permanent speed variation with change of load which can conveniently be made adjustable. In cases where permanent speed variation is not required the third movement may be dispensed with.

For the purpose of the combined movement previously indicated, the mounting of the rocking lever can be carried out in the following manner.

On a fixed spindle is arranged a sliding sleeve which is capable of axial sliding and of rotation about the spindle, and to this sleeve is connected, by a pivot having an axis at right angles to that of the spindle, the rocking lever which has a central aperture within which the sleeve is located. The lever can accordingly rock at right angles to the axis of the sleeve, and can move with the sleeve either along or around the axis of the spindle.

A convenient arrangement of the lever in relation to the governor and pilot valve is one in which the axis of the governor is parallel with the axis of the valve and the lever is approximately at right angles to these two axes. Any disturbance of the governor from a position of equilibrium will cause its actuating rod to impart movement to the end of the lever on which it presses, thereby rocking the lever and causing it to give a corresponding movement in the opposite direction to the pilot valve which is in contact with its other end. This movement of the valve, as previously indicated, brings about a displacement of the servo-motor in such a direction as to bring about a re-adjustment of the working conditions to satisfy the cause of the disturbance of the governor. As the servo-motor moves it rocks the lever about an axis at right angles to that around which its first movement took place, and this displacement is caused to impart movement to the pilot valve in a sense opposite to that of the initial movement so as to bring the servo-motor to rest. This result can be brought about by giving the lever at each end a laterally extending face one of which remains in contact with the pilot valve and the other with the governor rod while the second rocking movement takes place, and by giving to one or both of these faces an inclination by which the return motion is produced. In general, it will suffice to have a flat face at one end of the lever and an inclined face at the other end. By an appropriate determination of the form of this inclination, the correct relationship between the position of the servo-motor and the position of the pilot valve for the whole range of action may be obtained. For instance, by giving this face different slopes on the two sides of the position at which it is engaged by the governor rod for normal or standard conditions (for instance "full load" conditions), it may be provided that the servo-motor acts more rapidly on rise of speed, due to sudden decrease of load, than it does in the case of a fall in speed following an addition of load.

The return motion effect just described is preferably produced through the intermediary of a dash-pot working in conjunction with re-setting springs to bring about the slow reversal of the second rocking motion of the lever, so that after each change of conditions the lever is re-set in its initial position as regards rocking about the second axis. The result of this would be to bring about the return of the speed of the prime mover to the initial value after each disturbance. In some cases, however, it is preferable that there should be some slight permanent variation of speed as the load changes. This can be brought about by arranging that the part of the dash-pot to which movement is directly given by the servo-motor is connected with a mechanism by which axial displacement of the sleeve carrying the rocking lever can be produced whenever the servo-motor moves. This mechanism may have the form of a cam pressing against the end of the sleeve, and inclined so as to move the sleeve axially when the cam travels transversely. By making the inclination of the cam adjustable, the permanent speed variation with load can be set to the desired value.

Figure 3:
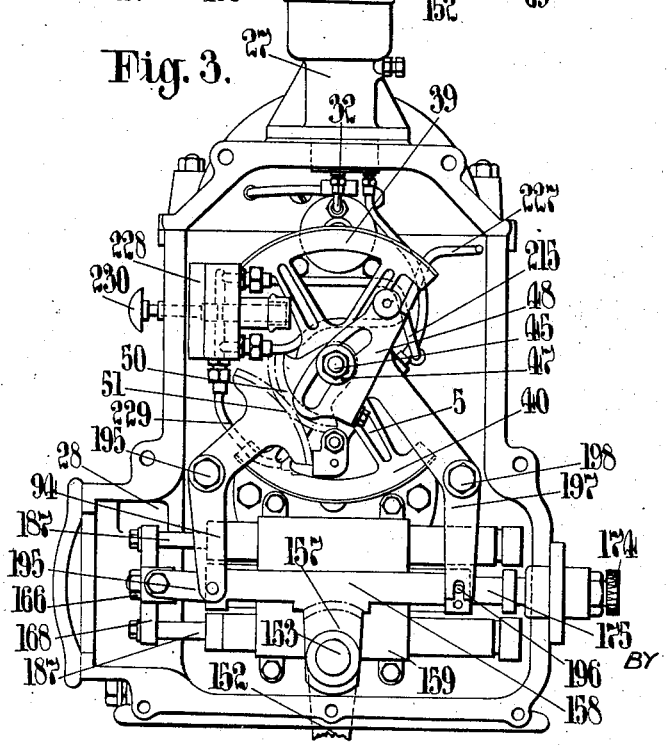

The invention will now be described by way of example with reference to the accompanying drawings of which Fig. 1 shows a partly diagrammatic sectional side elevation of governor gear according to this invention; Fig. 2 shows an outside end view of the gear shown in Fig. 1 looking from the right of that figure, together with servo-motor gear seen in section beneath the gear according to Fig. 1; Fig. 3 shows a view with the end cover and certain associated parts removed looking from the left of Fig. 1; Fig. 4 shows in sectional side elevation the rocking lever, and certain associated parts including the cam for producing permanent speed variation; Fig. 5 is a side view of the upper portion of the rocking lever which co-acts with the member controlled by the centrifugal governor; Figs. 6 and 7 respectively show cross sections on the lines VI—VI and VII—VII looking from the right of Fig. 5; Fig. 8 is a developed view of the cam which is seen in Figures 5, 6 and 7; Fig. 9 is a side view of the top part and the head of the lever for actuating the cam for producing permanent speed variation, and Fig. 10 is a view of the head of the said lever looking in the direction of arrow X Fig. 9; Figs. 11 and 12 show respectively a view looking on the top edge of the cam for producing permanent speed variation, and a side view of that cam; Figure 11$^a$ shows the arrangement for adjusting the position of this cam; Fig. 13 is a sectional side elevation of the principal parts of the main governor and of an emergency governor, and Fig. 14 is a sectional side view of an emergency valve which is actuated by the emergency governor shown in the position (hereafter referred to as the normal position) which it occupies when the governor is running at a speed within the normal working range of the prime mover with which it is associated, whilst Fig. 15 is a sectional side view of an emergency piston, which is actuated through the emergency valve, and certain co-operating parts. The complete organization of the emergency control apparatus is shown in Fig. 15A. Fig. 16 shows a sectional side elevation of an arrangement of pilot valve and distributing valve, Fig. 17 is a side view of return motion gear and associated parts showing certain inner parts dotted in position; Fig. 18 is a sectional view on the line XVIII—XVIII of Fig. 17; Fig. 19 is a sectional side view of the central cylinder of the dash-pot of the return motion gear, and Fig. 20 is a sectional side elevation of the upper one of the two outer cylinders of the dash-pot of the return motion gear; Figs. 21 to 24 are approximate curves in connection with an hydraulic turbine showing certain relationships between servo-motor movement, turbine speed, and in the case of Figs. 21 and 23 water pressure, with respect to time, which is measured horizontally from left to right while the other quantities are measured vertically.

The centrifugal governor 1 is arranged in the upper part of the gear on a horizontal axis, and the pilot valve 2 and distributing valve 61 are arranged on another horizontal axis below centrifugal governor 1, and in the same plane therewith. From the governor 1 projects at one end a part associated with sliding rod 4, which makes contact with one end of the vertically disposed rocking lever 5, the other end of which presses against the end of the spring-supported needle 6 of the pilot valve.

The pendulum of the main governor as shown in Fig. 13 comprises a casing including two portions 7 and 8 in the former of which are two guides 9 in and on the edges of each of which may roll a roller 10 that also bears against a disc 16. The edges of the guides may be fitted with hardened plates as shown. The two parts of the casings 7 and 8 are rigidly bolted together as indicated in the drawings, the casing being supported from the main casing by ball bearings 11 and 12. Disc 16 is slidably and rotatably mounted on bush 13, secured to and fitting over a projecting part of the main casing as shown in Fig. 1. The governor casing may be driven round by a pulley wheel 14 bolted to portion 8 of that casing, and the chief forces determining the equilibrium position of rollers 10 are the outward force produced by their rotation, and the force due to springs 15, which act between the recess in the outer face of disc 16 and disc 17 which is supported by point contact with screw 18 by rotation of which the compression of springs 15 may be adjusted, after which screw 18 should be locked by suitable means such as the lock nut indicated. Disc 17 is locked to rotate with portion 8 of the governor casing by pegs 20. The action of springs 15 is to tend to push disc 16 along bush 13 from right to left and therefore to force rollers 10 inwards owing to the inclination of their guides 9 and the configuration of disc 16. When rollers 10 are at rest they may be supported by sleeve 19 projecting from the main casing. To disc 16 is rigidly attached rod 4 around the outer part of which slidingly fits a sleeve 21 which is arranged to rotate in bush 22 in the main casing. Sleeve 21 is urged away from disc 16 by compression spring 23 acting between a collar on rod 4 and sleeve 21. Pin 24 projecting from the inside of sleeve 21 through slot 25 in rod 4 prevents relative rotation between the sleeve and rod, and allows only limited relative sliding movement between them. Spring 23 normally holds the two parts in the relative position shown in Fig. 13. On the outer end of sleeve 21 is adjustably mounted ball bearing 26 by means of a screw cap.

In order to impart steadiness and to avoid pendulum movements of an oscillatory nature a damping device in the nature of a dash-pot 27 is provided. An exchange of fluid takes place between dash-pot 27 and chamber 33 by way of pipe 32 when disc 16 moves along bush 13, and the action of the dash-pot is to cause the governor more quickly to attain a condition of stability.

Referring more especially to Figs. 4 to 8 the rocking lever 5 comprises a central boss from which project two pairs of arms 37 and 38 respectively carrying at their extremities arcuate or segmental pieces 39 and 40 to which are screwed cam 41 and facing 42. The rocking lever is pivotally supported on a sleeve 43 by two pins 44, and sleeve 43 is slidably and rotatably mounted on spindle 45 projecting from the main casing. Thus the rocking lever may be given motion of rotation around two axes at right angles to one another, and motion of translation by sliding sleeve 43 along spindle 45 towards or from the main casing. Between a shoulder formed by an enlargement near the inner end of spindle 45, and a shoulder formed by an annular inwardly extending flange on sleeve 43 is arranged a compression spring 46 which urges sleeve 43 away from the main casing. Such movement of sleeve 43 is limited by a washer 47 held in position by a locked nut on the outer end of spindle 45. Between washer 47 and the outer end of sleeve 43 is interposed the head 48 of a lever, hereinafter to be further described, which carries a cam 49 for producing permanent speed variation with change of load. Integral with sleeve 43 is a segmental toothed part 50 which meshes with a similar toothed part 51 the action of which as will be explained later is to rotate sleeve 43 round the axis of spindle 45 in order to return the pilot valve to an equilibrium position. Facing 42 bears against a ball bearing 52 associated with the pilot valve needle 6. Cam 41 has an inclined operative surface as is seen in the developed view shown in Fig. 8 and from the depth of the cross sections of the cam in Figs. 6 and 7. It should also be noticed that the slope of the cam 41 varies and is greater from its centre towards the left than from its centre towards the right. These lines of slope are not intended to be drawn to scale the difference between the two slopes having been exaggerated so that it may be clearly recognized. In some cases the slope of this cam may be made uniform throughout its length.

Turning to Figures 1 and 16, the needle 6 of the pilot valve 2 is slidably mounted in a part of the main casing and is urged outwards by a compression spring 54 which acts between the main casing and a head 56, which is rigidly attached to needle 6 and which holds ball bearing 52 that bears against facing 42. Valve 2 is arranged so that in the equilibrium position needle 6 is just clear of its seating 57, so that a continuous flow of pressure fluid takes place constituting a leakage from a cylinder associated with a piston between which members relative sliding movement may take place. The pressure fluid from an external source of supply enters the casing by way of the pipe 250 (Fig. 2) and flows thence through a short passage to the circular canal 58 (see Fig. 16) formed between portions of the main casing and thence through ducts 59 and past an adjustable throttling screw 60 to the said cylinder. The passage through ducts 59 may be more or less closed by rotating screw 60, so that the pressure at the seating 57 of the pilot valve may be nicely adjusted. The distributing valve 61 comprises two rings 62 and 63 which slidingly fit a cylindrical lining 64 which tightly fits into a cylindrical part 65 of the main casing. Part 65 is provided internally with two spaced annular recesses so that annular spaces 66 and 67 are defined by the said recesses and by portions of the outer surface of lining 64. Space 66 is connected through hole 68 in part 65 of the main casing to a canal (not shown) in the main casing, which canal leads to the opening side of the servo-motor which will be described hereinafter, and space 67 is similarly connected by canal 69 to the closing side of the servo-motor. Between the partitions which support rings 62 and 63, and parts of the main casing which close the ends of cylindrical part 65 are annular spaces 70 and 71 which are both connected to the oil sump. The space 72 between the inner portions of rings 62 and 63 is connected by short passages 73 to canal 58. Through rings 62 and 63 are respectively formed co-operating sets of ports 74 and 75, and co-operating sets of ports 76 and 77, which severally act in conjunction with sets of ports 78 and 79, and sets of ports 80 and 81, formed in lining 64 at points above space 66 or space 67.

When the valve 61 is in its central and neutral position as shown none of the said sets of ports coincide with each other and no pressure fluid can flow through the distributing valve. If, however, the valve 61 moves to the right, ports 76 in ring 62 coincide with ports 80 in lining 64 and ports 77 in ring 63 coincide with ports 81 in lining 64. Thereupon pressure fluid flows from canal 58, through passages 73 to space 72, and thence through ports 76 and 80 to space 66, and by way of canal 68 to the opening side of the servo-motor, whilst fluid from the closing side of the servo-motor flows by way of canal 69 to space 67, and through ports 81 and 77 to space 71, and thence to the oil sump.

Similarly if the valve 61 is moved to the left, pressure fluid flows from canal 58 through passages 73 to space 72, and thence through ports 75 and 79 to space 67, and by way of canal 69 to the closing side of the servo-motor, whilst fluid from the opening side of the servo-motor flows by way of canal 68 to space 66, and through ports 78 and 74 to space 70, and thence to the oil sump.

The needle 6 of valve 2 is used to produce the displacement of a minor distributing valve, which comprises a spindle 82 near one end of which is formed piston 83, which slides in cylinder 84 formed in a part of the main casing. The central part and end part of spindle 82 has a sliding fit in a barrel 85. The inside of barrel 85 is reduced internally to form a shoulder between which and the underside of piston 83 acts a compression spring 86 to urge piston 83 into cylinder 84. Spindle 82 is extended from the top of piston 83, and this extension closely fits in and projects through a hole in the wall forming the cylinder cover, and the extension is bored to form an axial duct which communicates by hole 87 with the interior of cylinder 84, and which is arranged so that its outer end forms seating 57 for needle 6. Barrel 85 screws into valve 61 and moves therewith, the parts of the barrel near its ends having a sliding fit in nut 88, screwed to a part 89 of the main casing, and at the other extremity in portion 90 of the main casing. The valve 61 is made with an axially arranged cylinder in each end, and one cylinder has a sliding fit on the piston formed by part 89 of the main casing, and the other cylinder has a sliding fit on the piston formed by the portion 90 of the main casing, so that chambers 91 and 92 are formed between those respective pistons and valve 61. The valve is restrained from rotating by key 99 associated with portion 90 of the main casing. The middle part 93 and the two end parts 94 and 95 of the portion of spindle 82 which fits slidingly in barrel 85 are plain, but between parts 93 and 94, and parts 93 and 95 extend sets of grooves 96 and 97 respectively, and the several grooves of each set are connected at their ends by annular grooves. When spindle 82 is in its normal central position the ends of the portion of barrel 85 into which the spindle slidingly fits are closed by parts 94 and 95, and an annular recess 98 arranged in the middle of that portion of the barrel is covered by part 93. Annular recess 98 is in communication with the pressure fluid in space 72 through a set of holes 100 in the barrel walls, annular recess 101, which extends for an appreciable distance on the interior of the inner surface of valve 61 to either side of the centre line of that body, and through restricted passage 102. Sets of ports 103 and 104 in the walls of barrel 85 connect annular recesses on the interior of those walls to the several chambers 91 and 92.

When the speed of the prime mover rises rollers 10 move outwards so that ball bearing 26 is retracted and rocking lever 5 rotates in a clockwise direction about pivot pins 44. Facing 42 therefore moves away from ball bearing 52, and under the influence of spring 54 needle 6 of valve 2 moves away from seating 57. The pressure in cylinder 84 therefore falls since there is a freer flow of fluid through hole 87 and past valve seating 57, and spring 86 moves piston 83 further into cylinder 84. Part 93 therefore no longer covers annular recess 98 and pressure fluid flows from that annular recess along grooves 97 through ports 104 to chamber 92. At the same time part 94 no longer closes the end of barrel 85 so that fluid flows from chamber 91 through ports 103 and grooves 96 to the space containing spring 86, whence it flows by way of ducts 53 towards the sump. The valve 61 is thus moved from right to left with the result that sets of ports 74 and 78 and sets of ports 75 and 79 coincide to a greater or less extent so that the pressure fluid is connected to the closing side of the servo-motor in the manner already described. The movement of valve 61 towards the left tends to cause the parts 93, 94 and 95 of spindle 82 to resume their normal positions with respect to barrel 85, and spring 86 becomes more compressed and in its turn presses piston 83 further into cylinder 84 so that seating 87 approaches needle 6, and a state of equilibrium tends to be again produced between the forces acting on valve 2.

Similarly when the speed of the prime mover falls needle 6 is forced by facing 42 towards seating 57, and the pressure in cylinder 84 rises and piston 83 is forced against the action of spring 86 to move outwards from the said cylinder. Part 93 then no longer covers annular recess 98 and pressure fluid flows therefrom along grooves 96 and through ports 103 to chamber 91. At the same time part 95 no longer closes the end of barrel 85 so that fluid flows from chamber 92 through ports 104 and grooves 97 to space 105 whence the fluid flows through opening 106 towards the oil sump. The valve 61 is thus moved from left to right with the result that sets of ports 76 and 80 and sets of ports 77 and 81 coincide to a greater or less extent so that the pressure fluid is connected to the opening side of the servo-motor in the manner already described. The movement of valve 61 towards the right tends to cause parts 93, 94 and 95 to spindle 82 to resume their normal positions with respect to barrel 85, and spring 86 becomes less compressed and in its turn allows piston 83 to move further out of cylinder 84 so that seating 57 becomes retracted from needle 6, and a state of equilibrium tends to be again produced between the forces acting on valve 2.

Actuation of the servo-motor influences needle 6 in the way hereinafter to be described.

The rate of flow of pressure fluid into either of the chambers 91 and 92 is limited by restricted passage 102, and the rate of flow of pressure fluid from the opening and closing sides of the servo-motors is limited by rings 107 and 108 respectively, which are screwed into the outer ends of rings 62 and 63. Ring 107 is arranged with a small space 109 between its inner edge and the adjacent portion of valve 61 through which space fluid from the opening side of the servo-motor has to pass before reaching space 70. Ring 108 is arranged to slide on a part of portion 90 of the main casing, and a series of holes 110 in ring 108 allow fluid from the closing side of the servo-motor to pass at a relatively slow rate from ports 77 to space 71.

The running speed of the prime mover at which equilibrium of pilot valve 2 is produced may be adjusted by axial displacement of the seating 57 of the needle 6. This may be effected by turning barrel 85 relatively to valve 61, whereupon barrel 85 which is screwed into valve 61 moves axially relatively thereto. Relative movement also occurs between barrel 85 and spindle 82 with the result that part 93 no longer covers annular recess 98, and pressure fluid flows to one of the chambers 91 and 92, valve 61 is moved axially so that certain of the ports in rings 62 and 63 move under the corresponding ports in lining 64. Pressure fluid then flows through the ports of distributing valve 61, in a manner similar to that already described, to work the servo-motor. Actuation of that motor causes the prime mover to change its speed which accordingly produces axial movement of needle 6, which movement allows spindle 82 to move to some fresh position corresponding to a new running speed of the prime mover in which position equilibrium of the forces acting at pilot valve 2 is attained, and part 93 again covers annular recess 98. Movement of barrel 85 relative to valve 61 is limited by shoulder 111 formed on the barrel, and by nut 112 screwed and locked on the barrel. Diametrically opposite slots are cut in the end of barrel 85 remote from pilot valve 2, and into these slots fits a flat tongue 113 on shaft 114 which passes through and has a bearing in the main casing. The slots in the end of barrel 85 extend beyond the end of tongue 113, so that by rotation of shaft 114 the barrel may be caused to move axially in either direction to the full limits allowed by shoulder 111 and nut 112.

Rotation of shaft 114 may be brought about by means of bevel wheel 128 rigidly attached to the outer extremity of the shaft. Wheel 128 meshes with two wheels 129 and 130 severally associated with shafts 131 and 132.

Shaft 131 may be rotated by handwheel 133, and shaft 132 is adapted to be driven through slipping clutch 141 shaft 142 and worm gear 143 from electric motor 144 which may be controlled from a distance. Slipping coupling 141 prevents motor 144 from giving barrel 85 a movement relative to valve 61 greater than that arranged for and allowed by the stops provided.

The servo-motor is preferably placed below the main casing of the gear just described, as shown in Fig. 2, and is in the form of a double acting piston 145, which slides in a cylinder having spaces between the ends of piston 145 and cylinder covers 146 and 147. The end of lever 148 rigidly mounted on shaft 149 is slidably arranged in socket 150 rotatably mounted in piston 145. Thus when piston 145 moves towards the left (under the action of pressure fluid admitted through the canal 69 which is a continuation of the canal 69 shown in Figure 16) lever 148 and shaft 149 are rotated in an anti-clockwise direction to close more or less, according to the extent of movement of piston 145, suitable controlling gear for regulating the supply of fluid to the prime mover. Conversely, when piston 145 moves towards the right (under the action of pressure admitted through the canal 68 which is a continuation of the canal 68 in Figure 16) shaft 149 is rotated in a clockwise direction and the said controlling gear is actuated to give a fuller supply of motive fluid to the prime mover.

A rod 151 is rigidly attached to piston 145, and projects through a gland in cylinder cover 146, and is associated with any suitable gear, not shown, for controlling the servo-motor by hand in order to start and to shut down the prime mover.

In addition to giving movement to the controlling member of the prime mover, piston 145 also actuates an arm 152, which gives movement to a rocking shaft 153 arranged below and parallel with the axis of distributing valve 61. Such movement is effected through guides 154 rigidly mounted on piston 145, and in which roller 155, attached to the end of arm 152, slides.

Shaft 153, which carries indicating arm 156, is provided with a double toothed segment 157, each part of which segment engages with a toothed rack 158, both of which preferably are connected with a dash pot.

The construction of the dash pot may best be seen from reference to Figs. 17 to 20. A bracket 159 is attached fast to the main casing by screws 160, and there pass through it two outer cylinders 161, and an inner cylinder 162, the former of which are held rigidly in place, but the latter is arranged to move in the cylindrical guide afforded by bracket 159, which is disposed across one end of the distributing valve casing adjacent to but below rocking lever 5.

The central cylinder comprises two parts 163 and 164, united by being screwed upon a body 165. A spindle 166 passes through and slidingly fits in body 165 and the outer end of part 163, which is of smaller interior diameter than the remainder of the cylinder. A central portion of spindle 166 is enlarged to form piston 167, which slidingly fits part 163 of the cylinder. One extremity of spindle 166 is screwed fast into the middle of crosshead 168, and the portion of the spindle on the side of piston 167 remote from crosshead 168 is formed as a tube through which passes and into which adjustably screws rod 169. Through the centre of piston 167 passes duct 170, which is joined at its ends, by radial holes 171 and 172 in spindle 166, to the spaces outside that spindle. The outer end of rod 169 is hexagonal in cross section. The inner end of rod 169 is formed with a point 173, which partly closes the end of duct 170, and by rotating rod 169 relative to spindle 166 so as to screw it along and give it axial movement in relation thereto, the extent to which point 173 closes the end of duct 170, and therefore the rate of flow of fluid therethrough may be regulated. This adjustment may be effected by rotating knurled knob 174 formed on the end of sleeve 175. Sleeve 175 extends into and has a clearance in part 164 of the cylinder, and the extremity of the axial hole which extends for the greater part of the length of the sleeve is of hexagonal shape to fit the similarly shaped part of rod 169. A part of the outside of sleeve 175 is threaded and arranged to screw through flanged boss 176 secured over an aperture in the main casing, and two limit nuts 177 are locked one at each end of this threaded part.

When knob 174 is turned, rod 169 is caused to rotate, and point 173 to move farther into or farther out of the end of duct 170. At the same time sleeve 175 screws along relative to boss 176, and if the movement continues one of the nuts 177 contacts with an end of the boss, and further movement in that direction is prevented. Thus the adjustment of the rate of flow of fluid through duct 170 is limited, and moreover that duct cannot accidentally be totally closed by point 173. On the ends of parts 163 and 164 are formed rectangular flanges 178 and 179, to pairs of opposite faces of which racks 158 are attached. Rod 169 and sleeve 175 are made of sufficient length to prevent their disengaging when movement of piston 167 takes place.

When cylinder 163, 164 moves axially, spindle 166, together with rod 169, cross-head 168 and parts closely associated therewith, move bodily with the cylinder since piston 167 is arranged in a closed cylinder filled with fluid which can pass from one side of the piston to the other only at a slow rate. The action of parts associated with cylinders 161 is, however, to return cross-head 168 to its normal position, and this movement is slowly accomplished as fluid passes from one side of piston 167 to the other through duct 170.

Each outer cylinder 161 is formed at its centre with an annular projection 180, against the sides of which are pressed seating rings 181 and 182 by compression springs 183 and 184, which respectively act between caps 185 and 186, screwed on and over the ends of cylinder 161 and the seatings on rings 181 and 182. A rod 187 slidably fits through the central flanged hole in cap 185, and through the similar hole in ring 181, and is formed with a head 188 larger than the latter hole. Rings 181 and 182 do not fit closely but loosely in cylinder 161, and there is a central hole 190 in the cap 186 and holes 189 in ring 182 and rod 187 leading to the space in which the spring 183 is accommodated so that fluid in the cylinder does not offer appreciable resistance to movement of rod 187 in either direction. Cylinder 161 is rigidly held in bracket 159, since cap 185 screws against sleeve 191 which abuts against the end of the bracket, and annular shoulder 192 is drawn tightly against the other end of the bracket. Each rod 187 is rigidly attached by screwed means to crosshead 168 near an end thereof. It is arranged for the dash pot to be submerged in working fluid the level of which is determined by the position of the overflow aperture 28.

When crosshead 168 moves rods 187 from their normal positions springs 183 or springs 184 become compressed and tend to force the crosshead back to the position which it usually occupies.

Crosshead 168 is connected by links 193 to one end of the two armed lever 194, pivotally mounted on main casing at 195. The arm on the other side of pivot 195 terminates in toothed segment 51, which gears with the similar segment 50 fixed on the sleeve on which rocking lever 5 is mounted. By this arrangement is brought about the second movement of the rocking lever, which is a direct consequence of the displacement of the servo-motor, since when the servo-motor moves motion is transmitted through arm 152 and by way of the dash pot to lever 194 and segment 50, such movement being reversed as springs 183 or 184 come into operation.

It has now been seen how speed variation of the prime mover and governor pendulum produces rotation of rocking lever 5 about pins 44, how this movement disturbs the equilibrium of the forces acting at pilot valve 2, how upon the failure of this equalibrium distributing valve 61 is actuated to control movement of the servo-motor, how the servo-motor works and regulates the controlling gear of the prime mover, and how rocking lever 5 is rotated with sleeve 43 about spindle 45 by motion transmitted from piston 145 of the servo-motor.

In order to admit pressure fluid to the closing side of the servo-motor, rocking lever 5, as seen in Fig. 1, is rotated about pins 44 in a clockwise direction, and consequent movement of the servo-motor produces rotation of the rocking lever about the axis of spindle 45 in an anti-clockwise direction, as seen in Fig. 3. Since cam 41 is inclined, the latter rotation of rocking lever 5 tends to cause rotation of the said rocking lever about pins 44 in an anti-clockwise direction as seen in Fig. 1, and this movement tends temporarily to compensate and neutralize the effects of the initial movement of the rocking lever, thus readjusting the distributing valve to its neutral position. Crosshead 168 and lever 194, however, slowly return to their normal positions, thus rotating rocking lever 5 back to its central position on spindle 45, as seen in Fig. 3. In this manner the compensating and neutralizing effect is gradually cancelled, and the re-establishment of stability among the forces acting at distributing valve 2 is a relatively slow and continuous process, terminating only when rocking lever 5 has returned to its said central position.

Likewise, in order to admit pressure fluid to the opening side of the servo-motor, rocking lever 5 as seen in Fig. 1 is rotated about pins 44 in an anti-clockwise direction, and consequent movement of the servo-motor produces rotation of the rocking lever about the axis of spindle 45 in a clockwise direction as seen in Fig. 3. A compensating and neutralizing effect similar to that described in the previous paragraph results but the degree to which this effect is produced is different in the two cases, since the slopes of cam 41 on either side of its radial centre line are different, and this point will be referred to later.

Racks 158 at their ends remote from crosshead 168 are fitted with trunnions 196, which are engaged by slots in the lower arms of a two armed lever 197 pivotally attached to the main casing at 198, and carrying on its upper arm the slotted head 48 and similarly slotted cam 49 which may be seen in Fig. 4 and Figs. 9 to 12. Cam 49 is held on head 48 by screws adapted to pass through holes 199 and 200, and to screw into cam 49, and hole 200 is made larger than the diameter of the screw 252 in such a way that adjustment of the position and inclination of cam 49 may be effected by rotating the cam about the screw passing through hole 199, and to facilitate this movement the corner 201 of cam 49 is curved off. The adjusting screw 252 is secured in the hole 200 in the head 48 by means of curved seating pieces 255 and 256, the former of which fits in a correspondingly curved recess on the inner face of the head while the latter lies on a correspondingly shaped projection on the outer face of the head. The screw 252 turns freely in apertures in these seating pieces and the latter can slide on the parts of the head 48 against which they fit. The seating pieces are held in place by the collar 254 integral with the screw 252 and by the adjusting head 257 which is secured to that screw by a transverse pin. It will be seen that by this mounting it is provided that the screw 252 can have a free rotary movement in the head 48 and a slight angular displacement in addition but cannot have axial movement through the hole 200. Accordingly, rotation of the adjusting head 257 will cause the adjacent part of the cam 49 to travel along the threaded portion of the adjusting screw 252 between the limits set by the collar 254 and the nut 253 which is pinned to one end of the adjusting screw. The screw which passes through the hole 199 in the head 48 and engages the tapped hole 258 shown in the underside of the cam 49 serves as a pivot and clamping screw for the cam 49. By these adjustments the setting of the permanent speed variation of the prime mover with variation of load produced by given movements of cam 49 relative to spindle 45 may be varied. Cam 49 may, for instance, be arranged to produce a speed 5% lower at full load than at no load.

When pressure fluid enters the closing side of the servo-motor, arm 152 moves in an anti-clockwise direction as seen in Fig. 17, rack 158 moves from right to left, and lever 197 rotates about pivot 198 in a clockwise direction, with the result that a thicker part of cam 49 is forced between the end of sleeve 43 and washer 47. Sleeve 43 therefore moves from left to right against spring 46, which movement causes rocking lever 5 to have a new neutral position, with the result that when stability of the forces acting at distributing valve 2 is again attained the prime mover runs at a greater speed than it would do had cam 49 not come into operation. Cam 49 remains in its new position so long as the servo-motor stays at rest.

In a similar way when pressure fluid enters the opening side of the servo-motor, lever 197 rotates about pivot 198 in an anti-clockwise direction, and a thinner part of cam 49 is moved between the end of sleeve 43 and washer 47. Sleeve 43 therefore moves from right to left, as seen in Fig. 4, under the influence of spring 46, which movement causes rocking lever 5 to have a new neutral position, with the result that when stability of the forces acting at pilot valve 2 is again attained the prime mover runs at a smaller speed than it would do had cam 49 not come into operation.

The position of the dash pot previously indicated has the advantage that, being in the lower part of the casing and distant from the rapidly rotating parts of the gear, it can conveniently be arranged for the part of the casing in which it is situate to be filled with oil, so that the dash pot cylinder is entirely immersed, thus preventing the possibility of air entering.

In addition to the normal speed regulation through the agency of the rocking lever, an emergency control may be provided. Referring to Figs. 1, 13 and 14, on the rotating part 8 of the casing of the centrifugal governor is arranged a second governor, of less sensitiveness than the main governor, which comes into action only when the speed departs materially from the normal, either upward or downward.

The axially slidable part 202 of the emergency governor slides only on extension 203 of part 8, and depends for its movement on masses 231 pivoted to projections associated with part 8, and connected to slidable part 202 by links 232. As masses 231 fly outwards under centrifugal force part 202 is drawn towards the left, against the action of springs 206, by links 232.

The flange 210 of part 202 is arranged to run within a groove 211 in piston 212, which normally covers two ports 213 leading from duct 214 connected by pipe 215 to the cylinder of the emergency piston 222. A valve apparatus 228, as shown in Fig. 15A, is introduced between the pipe 215 and the cylinder 222 for a purpose to be presently described. Piston 212 is flexibly held over ports 213, and urged to that position by spring 216, which acts between washers on the piston spindle. The inner washer may rest against the annular shoulder in cylinder 217, and the outer washer may rest against the annular shoulder in ring 218. By screwing ring 218 along inside the extension to cylinder 217 the normal position of piston 212 may be adjusted. A screw is provided for locking ring 218 in position, a cap 219 covers the end of the extension to cylinder 217, and a hole 220 allows for the escape of pressure fluid from the right hand port 213 when piston 212 has uncovered it by moving towards the left.

Turning to Fig. 15, the emergency piston 222 is provided with a projection 223, arranged to slide through the cover of cylinder 224, which it is urged to do by spring 225, acting between the inside of piston 222 and cap 226 screwed onto the end of an extension screwed to cylinder 224. Normally when the governor is in operation projection 223 is retracted by pressure fluid supplied through pipe 227 to cylinder 224, to compress spring 225, the stroke of piston 222 being limited by an annular shoulder on the inside of cylinder 224. That cylinder is supported by the casing, so that projection 223 is immediately opposite and near arcuate piece 39. Pipe 215 may act as a by-pass to pipe 227 to allow pressure fluid to flow to exhaust.

Travel of flange 210 axially beyond the clearance allowed in either direction due to abnormal rise or fall of speed of the prime mover produces such displacement of piston 212 that ports 213 become uncovered at the desired speed limit, pipe 215 is connected to exhaust, the pressure in cylinder 224 is relieved, and spring 225 forces piston 222 to move so that projection 223 contacts with segmental part 39 and causes rocking lever 5 to rotate in a clockwise direction as seen in Fig. 1, about pins 44, sleeve 21 sliding within the limits permitted along rod 4 and spring 23 becoming compressed. Thus needle 6 moves to the full open position, distributing valve 61 moves from right to left, pressure fluid is admitted to the closing side of the servo-motor and the prime mover is shut down.

During starting the emergency governor may be rendered inoperative by the manipulation of valve 228, see Figs. 3 and 15A, which comprises a casing containing a duct, to one end of which is connected pipe 215 leading to the emergency valve, and to the other end of which are connected pipes 227 and 229, leading respectively to the emergency piston, and to the pressure fluid supply. At the middle of the duct and transverse thereto is a cylinder containing a piston provided with a central circular groove, and the piston is urged to and normally held in the position wherein the groove coincides with the said duct. Hence pipe 215 is normally connected through the duct to pipes 227 and 229. When, however, button 230 on the end of a spindle extending from the piston is pressed against the action of the spring, the groove in the piston moves away from the duct and the latter is closed by the piston, so that the emergency valve is rendered inoperative. Thus by pressing button 230 the turbine may be started up although the governor pendulum first runs at a speed below the lower permissible limit, and ports 213 of the emergency valve are open to exhaust.

It has already been considered how initial movement of needle 6 relative to seat 57 causes movement of the servo-motor, how movement of the servo-motor transmits motion through the associated dash pot and by virtue of the slope of cam 41 to needle 6, how the movement of this needle which is in a direction opposite to the initial movement thereof tends to neutralize the effects of the said initial movement, and how the dash pot causes this second movement of the needle to be reversed and gradually cancelled. Let there now be discussed with the aid of Figs. 21 to 24 some of the chief results of the compensating and neutralizing action brought about by the second movement of the rocking lever.

In these figures the turbine speed is indicated by the lines marked N, the servo-motor displacement by the lines marked S and the water pressure by the lines marked P. The lines O—O serve as a basis of reference for the quantities N and S, representing for the former quantity the normal speed of the turbine. The horizontal lines above the lines O—O each indicate a variation of speed of ten per cent away from the normal. It will be noted that in all of the four cases illustrated, the speed N is the same both before and after the disturbance. This corresponds to the case where the cam 49 is set so that its operative portion is parallel with that part of the head 48 which is in contact with the washer 47. The extent of movement of the servo-motor in the opening direction, that is, the direction to increase the supply of working fluid to the prime mover, is indicated by the distance of a point on the lines S above the line O—O. The pressure curves are shown below the other curves and have no reference to the lines O—O. The normal pressure is indicated by the broken horizontal lines.

Figure 21:
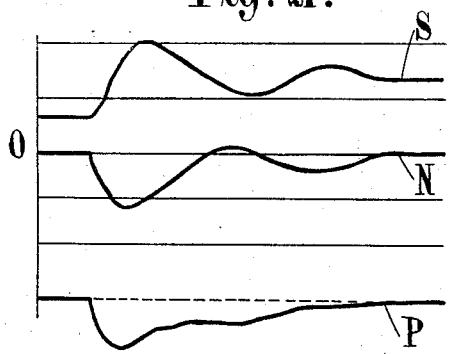
Figure 23:
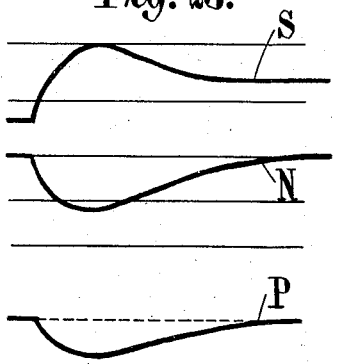
Figure 22:
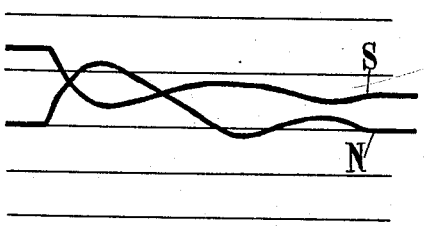
Figure 24:
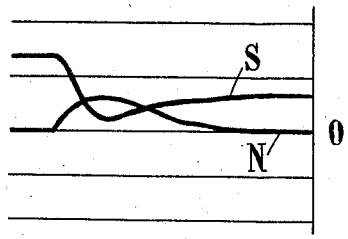

The curves are for identical plant working under the same conditions in the two cases illustrated respectively by the Figures 21 and 22 and by the Figures 23 and 24 with this exception that in the governor whose characteristics are shown in Figures 21 and 22 the compensation following any given movement of the needle of the pilot valve relative to its seating is substantially the same throughout the working range of the governor, that is, it corresponds to the case of a cam of uniform slope, whereas in the governor whose characteristics are shown in Figures 23 and 24 the compensation for such movement of the needle corresponds to the case of a cam of variable slope, as shown in Figure 8, so that it is greater for increase in load than for decrease in load. Moreover the compensation in the case of Figure 23 is greater than that in the case of Figure 21 whilst that for Figure 24 is less than that for Figure 22. Figures 21 and 23 represent the conditions under an increasing load and Figures 22 and 24 represent those under a decreasing load. These figures illustrate the advantageous effect of using a cam 41 having a variable slope as against one having a uniform slope.

The curves according to Figures 21 and 23 are for a sudden increase in load, say 50%. In Fig. 21 upon increase of load the speed quickly drops to 12% below normal speed and the servo-motor shortly after the occurrence of the increase of load rapidly moves towards the open position and continues so moving for an appreciable time after the negative peak of the speed curves is attained since the compensation is relatively small. The turbine speed therefore rises nearly as quickly as it dropped and reaches a speed above the normal, during which time the servo-motor moves towards the closed position, and, owing to the excessive speed attained and possibly to a time lag with which parts of the apparatus work when movement is quick, stops only when it has moved too far in that direction. As a consequence the speed again falls below normal and the servo-motor again moves towards the open position, and travels further than the position which it finally takes up after its motion has been reversed subsequent to the speed curve having reached its second negative peak. Finally after a considerable period of time from the commencement of the disturbance normal speed is again attained. During this period the pressure first of all drops quickly and to a substantial value and then fluctuates in an irregular manner. Had the load changed to a greater extent probably the movement of the servo-motor would have been still more unsteady and irregular, the hunting more severe, and the time taken to reach normal speed even longer.

In Fig. 23 almost immediately the load comes on and the speed decreases the servo-motor starts moving towards the open position and nearly as soon as the negative peak of the speed curve is reached movement of the servo-motor stops and is reversed, since the relatively great compensation produced by cam 41 has brought the distributing valve to its central position, and the increase in turbine speed produced by the movement of the servo-motor has tended to cause needle 6 to move away from seating 57. Such movement is in part counteracted, however, by cam 41 being gradually returned to its central position by the dash pot springs, such motion being accelerated by the return of the servo-motor towards the closed position. Thus is prevented a sudden and rapid movement of the servo-motor towards the closed position with a consequent fall in speed below the normal, and it is ensured that the speed changes smoothly to the normal speed, and the servo-motor moves gradually to its stable position in far less time than if hunting occurred.

Since movement of the servo-motor towards the opening position produces relatively great compensation for the case illustrated in Fig. 23, such movement to the fullest extent realized for the increase of load takes a longer time than in the instance shown in Fig. 21. Owing, however, to the more gradual movement of the servo-motor no such sudden drop in pressure is experienced as in the case of Fig. 21, and, moreover, the pressure does not fall so low. The result is that the minimum turbine speed is reached less quickly and such speed is slightly higher than in the case already considered.

Figs. 22 and 24 relate to a sudden drop in load, say of 50%. It is seen from Fig. 22 that the movement of the servo-motor is again unsteady, that hunting occurs, and that a substantial period of time elapses between the drop in load and the return to normal speed.

The rise in speed according to Fig. 24 is much less than that according to Fig. 22. This is on account of the different degrees of compensation. The slope on the part of cam 41 which comes into operation upon an increase of speed is relatively small. The result is that when needle 6 approaches seating 57 through a given distance the servo-motor has to move a substantial way towards the closed position in order to bring the distributing valve back to its central position through the medium of cam 41, in other words the compensation is made small. It is therefore seen in Fig. 24 that the servo-motor closes to a larger extent than in Fig. 22, and that the rise of speed in the former figures is much less than in the latter figure. Nevertheless the compensating arrangement eventually returns needle 6 to the position which allows the distributing valve to return to its central position, and then acts as in the case of the sudden increase in load to prevent hunting taking place.

The face of cam 41 has been shown as two intersecting planes, but the face might be curved to give different degrees of compensation not proportionate to the extent of movement of the servo-motor towards the closed or the open position.

What I claim as my invention and desire to secure by Letters Patent is:—

1. Governor gear comprising a centrifugal governor, a pilot valve, a servo-motor controlled by the pilot valve, a rocking lever operatively associated with the pilot valve, a mounting for the rocking lever permitting it to have a compound motion including rocking movements in two different planes, means for imparting motion from the governor to the rocking lever in one plane and means for imparting motion from the servo-motor to the rocking lever in another plane, the first rocking motion being used for the purpose of transmitting to the pilot valve the initial displacement due to a change in speed and the second being used to bring about the return motion of the pilot valve due to the movement of the servo-motor by which the controlling member of the prime mover is actuated.

2. Governor gear comprising a centrifugal governor, a pilot valve, a servo-motor controlled by the pilot valve, a rocking lever operatively associated with the pilot valve, a mounting for the rocking lever permitting it to have a compound motion including rocking movements in two different planes and a movement of translation, means for imparting from the governor to the rocking lever rocking motion in one plane and means for imparting from the servo-motor to the rocking lever rocking motion in another plane and a movement of translation, the first rocking motion being used for the purpose of transmitting to the pilot valve the initial displacement due to a change in speed and the second being used to bring about the return motion of the pilot valve due to the movement of the servo-motor by which the controlling member of the prime mover is actuated, and the movement of translation being used for the obtaining of a permanent speed variation with change of load.

3. Governor gear comprising a centrifugal governor, a pilot valve, a servo-motor controlled by the pilot valve, a rocking lever operatively associated with the pilot valve, a mounting for the rocking lever permitting it to have a compound motion including rocking movements in two different planes, said mounting comprising a spindle, a sleeve on said spindle turning freely thereon and having a pivotal connection with the rocking lever, means for imparting motion from the governor to the rocking lever in one plane and means for imparting motion from the servo-motor to the rocking lever in another plane.

4. Governor gear comprising a centrifugal governor, a pilot valve, a servo-motor controlled by the pilot valve, a rocking lever operatively associated with the pilot valve, a mounting for the rocking lever permitting it to have a compound motion including rocking movements in two different planes and a movement of translation, said mounting comprising a spindle, a sleeve carried thereby and free to turn and slide axially thereon and having pivotal connection with the rocking lever, means for imparting motion from the governor to the rocking lever in one plane and means for imparting from the servo-motor to the sleeve a rocking movement and means separate from the last mentioned means for imparting from the servo-motor to the sleeve an axial sliding movement.

5. Governor gear comprising a centrifugal governor, a pilot valve, a servo-motor controlled by the pilot valve, a rocking lever operatively associated with the pilot valve, a mounting for the rocking lever permitting it to have a compound motion including rocking movements in two different planes, means for imparting motion from the governor to the rocking lever in one plane and means for imparting motion from the servo-motor to the rocking lever in another plane, the first rocking motion being used for the purpose of transmitting to the pilot valve the initial displacement due to a change in speed and the second being used to bring about the return motion of the pilot valve due to the movement of the servo-motor by which the controlling member of the prime mover is actuated, two segmental faces being provided on the rocking lever for engaging the governor actuated member and the pilot valve respectively, one of which faces is formed as a cam so that movement of these faces relative to the parts which they engage produces relative movement between the said parts themselves.

6. Governor gear comprising a centrifugal governor, a pilot valve, a servo-motor controlled by the pilot valve, a rocking lever operatively associated with the pilot valve, a mounting for the rocking lever permitting it to have a compound motion including rocking movements in two different planes, means for imparting motion from the governor to the rocking lever in one plane and means for imparting motion from the servo-motor to the rocking lever in another plane, the first rocking motion being used for the purpose of transmitting to the pilot valve the initial displacement due to a change in speed and the second being used to bring about the return motion of the pilot valve due to the movement of the servo-motor by which the controlling member of the prime mover is actuated, two segmental faces being provided on the rocking lever for engaging the governor actuated members and the pilot valve respectively, one of which faces is formed as a cam having different slopes on the two sides of its normal engaging position with its co-operating member so that movement of these faces relative to the parts which they engage produces relative movement at different rates between the said parts themselves so as to provide for more rapid action of the servo-motor taking place on rise of speed than in the case of a fall of speed.

7. Governor gear comprising a governor responsive to the speed conditions of a prime mover, a device regulating the rate of admission of driving fluid to the prime mover, a controlling member for said device, operative connections between the governor and the said member causing said member to influence said device in the sense appropriate for increase of admission when fall of speed takes place and vice versa, operative connections between the said device and the said member effective when the said device is moving to produce compensating control in a sense opposed to the movement, said connections including means for differentiating in the degree of this compensating control between those changes in which the speeds are above normal and those in which they are below normal.

8. Governor gear comprising a governor responsive to the speed conditions of a prime mover, a servo-motor regulating the rate of admission of driving fluid to the prime mover, a pilot valve controlling said servo-motor, a rocking lever operatively associated with the pilot valve, a mounting for the said lever permitting it to have a compound motion including rocking movements and a movement of translation, said mounting comprising a spindle, a sleeve carried thereby and free to slide axially thereon and having pivotal connection with the rocking lever, means for imparting rocking motion from the governor to the lever, a cam engaging said sleeve, means for transmitting movement from the servo-motor to the said cam to produce axial sliding of the sleeve when the servo-motor operates and thereby produce permanent speed variation of the prime mover when the rate of admission of working fluid is varied.

9. Governor gear comprising a governor responsive to the speed conditions of a prime mover, a servo-motor regulating the rate of admission of driving fluid to the prime mover, a controlling member for said servo-motor, a rocking lever transmitting movement from the said governor to the said member, a spindle substantially parallel with the line of movement of the said member, a sleeve slidably mounted on said spindle and pivotally supporting the rocking lever, a cam movable transversely to the said spindle and engaging the said sleeve, means for varying the form of the said cam and means for co-ordinating the movement of the cam with the movement of the servo-motor.

10. Governor gear comprising a governor responsive to the speed conditions of a prime mover, a servo-motor regulating the rate of admission of driving fluid to the prime mover, a controlling member for said servo-motor, a rocking lever transmitting movement from the said governor to the said member, a spindle substantially parallel with the line of movement of the said member, a sleeve slidably mounted on said spindle and pivotally supporting the rocking lever, an abutment, a cam movable transversely to the said spindle between the said sleeve and the said abutment and means for co-ordinating the movement of the cam with the movement of the servo-motor, the cam being formed of two parts, one of which engages the abutment and the other the sleeve, and means for adjusting the angle of inclination of one of these two parts to the other.

11. Governor gear comprising a governor responsive to the speed conditions of a prime mover, a member controlled by the said governor and disposed horizontally, a rocking lever engaging said member and extending substantially vertically downward therefrom, a pilot valve arranged on a horizontal axis below the said member and engaged by the rocking lever, a servo-motor controlled by the pilot valve, operative connections between said servo-motor and said rocking lever including a dashpot and forming a return motion mechanism, the said dashpot being arranged adjacent the pilot valve, a casing enclosing the valve and dashpot and means for maintaining the level of oil in the said casing at such a height that the dashpot is completely immersed.

12. Governor gear comprising a main centrifugal governor, a sliding member acted upon by said governor and imparting motion to a pilot valve, an emergency centrifugal governor, a spring member adapted to act upon the said sliding member, means for retracting said spring member by liquid under pressure and means controlled by the emergency governor for releasing the pressure liquid whenever the speed of rotation passes either above or below the normal limits.

13. Governor gear as set out in claim 12 in combination with means for putting the emergency governor out of action during starting up comprising a spring push button, a valve controlled by said button, an escape port controlled by the emergency governor and by the said valve in such a way that the liquid under pressure is cut off from the escape ports as long as the button is pressed.

In testimony whereof I affix my signature.

PAUL WERNER SEEWER.